(12) United States Patent
Martin et al.

(10) Patent No.: US 11,959,548 B1
(45) Date of Patent: Apr. 16, 2024

(54) AXLE ASSEMBLY AND METHOD OF CONTROL

(71) Applicant: ArvinMeritor Technology, LLC, Troy, MI (US)

(72) Inventors: Robert Martin, Troy, MI (US); Andrew Bodary, Troy, MI (US); Brian Hayes, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/179,448

(22) Filed: Mar. 7, 2023

(51) Int. Cl.
| | |
|---|---|
| *F16H 63/30* | (2006.01) |
| *B60K 23/08* | (2006.01) |
| *F16H 57/02* | (2012.01) |
| *F16H 57/037* | (2012.01) |
| *B60K 1/00* | (2006.01) |
| *F16H 57/00* | (2012.01) |

(52) U.S. Cl.
CPC .............. *F16H 63/30* (2013.01); *B60K 23/08* (2013.01); *F16H 57/02* (2013.01); *F16H 57/037* (2013.01); *B60K 2001/001* (2013.01); *B60K 2023/0891* (2013.01); *F16H 2057/0062* (2013.01); *F16H 2057/02052* (2013.01)

(58) Field of Classification Search
CPC ........ F16H 63/30; F16H 57/02; F16H 57/037; F16H 2057/0062; F16H 2057/02052; F16H 2057/02034; B60K 23/08; B60K 2001/001; B60K 2023/0883; B60K 2023/0891; B60K 1/00
USPC .......................................... 180/378; 301/137
See application file for complete search history.

(56) References Cited

U.S. PATENT DOCUMENTS

| | | | |
|---|---|---|---|
| 10,364,872 B2 | 7/2019 | Keeney et al. | |
| 10,500,940 B2 | 12/2019 | Garcia et al. | |
| 10,500,941 B2 | 12/2019 | Garcia et al. | |
| 10,704,597 B2 | 7/2020 | Smith et al. | |
| 10,801,602 B2 | 10/2020 | Peng et al. | |
| 10,808,830 B2 | 10/2020 | Begov et al. | |
| 10,808,834 B2 | 10/2020 | Soffner et al. | |
| 10,935,120 B2 | 3/2021 | Smith | |
| 10,985,635 B2 | 4/2021 | Smith et al. | |
| 10,989,288 B1 | 4/2021 | Ghatti et al. | |
| 11,002,352 B2 | 5/2021 | Ghatti et al. | |
| 11,038,396 B2 | 6/2021 | Raya et al. | |
| 11,124,054 B1* | 9/2021 | Hadad ................... | B60K 17/08 |
| 11,207,976 B2 | 12/2021 | Ghatti et al. | |
| 11,209,072 B2 | 12/2021 | Ghatti et al. | |
| 11,220,176 B1 | 1/2022 | Cradit et al. | |
| 11,273,700 B2 | 3/2022 | Garcia et al. | |
| 11,407,307 B2 | 8/2022 | Lorenz et al. | |
| 11,428,297 B1 | 8/2022 | Cradit et al. | |
| 11,679,656 B1* | 6/2023 | Atqiaee ................... | F16H 48/38 475/150 |

(Continued)

OTHER PUBLICATIONS

Honda Passport Forum, https://www.passportforums.com/threads/transmission-lock-release-tool.8196/, Feb. 25, 2022.

*Primary Examiner* — Keith J Frisby

(74) *Attorney, Agent, or Firm* — Brooks Kushman PC

(57) ABSTRACT

A method of controlling an axle assembly. The method may include removing an actuator that is adapted to actuate a shift collar from a housing of the axle assembly, installing a positioning mechanism in place of the actuator, and securing the positioning mechanism to the housing of the axle assembly.

20 Claims, 16 Drawing Sheets

(56) References Cited

U.S. PATENT DOCUMENTS

| | | | |
|---|---|---|---|
| 11,679,657 B1* | 6/2023 | Atqiaee | B60K 1/00 475/150 |
| 2019/0366838 A1* | 12/2019 | Hirao | F16D 21/02 |
| 2020/0247236 A1* | 8/2020 | Hirao | B60K 17/046 |
| 2021/0156464 A1* | 5/2021 | Ghatti | B60K 17/36 |
| 2022/0260136 A1* | 8/2022 | Chandrashekar | F16H 63/3013 |
| 2022/0260146 A1* | 8/2022 | Chandrashekar | B60K 17/02 |
| 2022/0316590 A1* | 10/2022 | Chandrashekar | F16H 61/0003 |

* cited by examiner

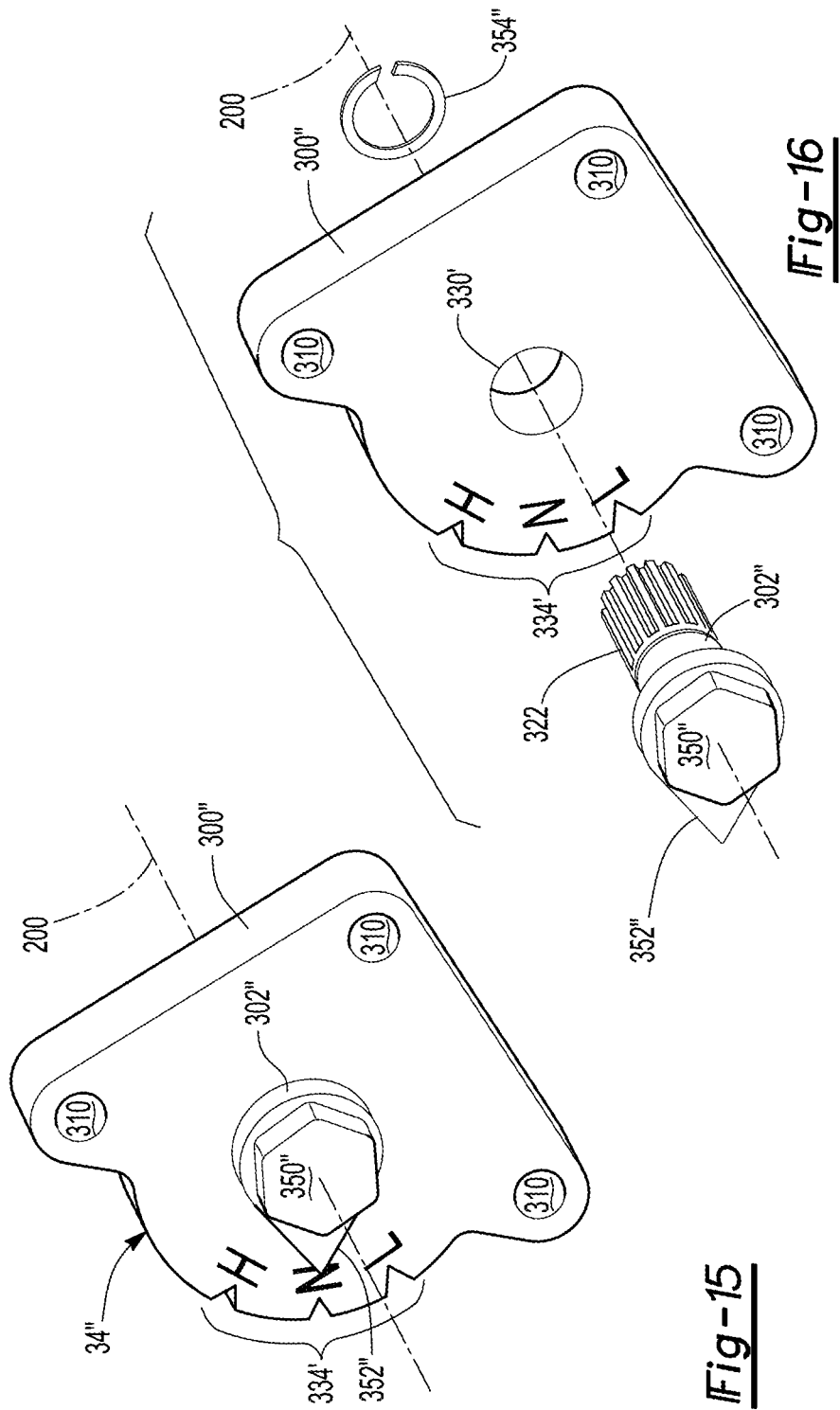

AXLE ASSEMBLY AND METHOD OF CONTROL

TECHNICAL FIELD

This relates to an axle assembly and a method of controlling an axle assembly.

BACKGROUND

An axle assembly having an electric motor module is disclosed in U.S. Pat. No. 11,038,396.

SUMMARY

A method of controlling an axle assembly is provided. The method includes removing an actuator from a housing of the axle assembly, installing a positioning mechanism in place of the actuator, and securing the positioning mechanism to the housing of the axle assembly. The actuator is adapted to actuate a shift collar.

Removing the actuator may include removing a fastener. The fastener may secure the actuator to the housing of the axle assembly. Securing the positioning mechanism may include reinstalling the fastener to secure the positioning mechanism to the housing of the axle assembly.

Removing the actuator may include moving the actuator along an actuator axis. Moving the actuator along the actuator axis may include moving the actuator away from the axle assembly. Moving the actuator along the actuator axis may disconnect an output shaft of the actuator from a cam of the axle assembly. The cam may be rotatable about the actuator axis.

The axle assembly may have a detent mechanism. Removing the actuator may include engaging the detent mechanism with the cam. Engaging the detent mechanism with the cam may inhibit rotation of the cam about the actuator axis.

The positioning mechanism may include a mounting plate and a shaft. The shaft may extend from the mounting plate. The cam may include a mounting feature. The mounting feature may be coupled to the actuator or the shaft. Installing the positioning mechanism may include engaging the shaft of the positioning mechanism with the mounting feature of the cam. Installing the positioning mechanism may include moving the shaft along the actuator axis into engagement with the mounting feature of the cam. The shaft may be engageable with the mounting feature at a single rotational position about the actuator axis.

The method may include moving the positioning mechanism after installing the positioning mechanism in place of the actuator. Moving the positioning mechanism may move the shift collar.

Moving the positioning mechanism may include attaching a tool to the positioning mechanism and exerting force with the tool. Exerting force with the tool may rotate the positioning mechanism.

Moving the positioning mechanism may occur before securing the positioning mechanism to the housing of the axle assembly.

Moving the positioning mechanism may include rotating the positioning mechanism about the actuator axis. The positioning mechanism may include a mounting plate and a shaft. The shaft may extend from the mounting plate. Rotating the positioning mechanism may include rotating the mounting plate and the shaft of the positioning mechanism together about the actuator axis.

Moving the positioning mechanism may occur after securing the positioning mechanism to the housing of the axle assembly. Moving the positioning mechanism may include rotating the shaft of the positioning mechanism with respect to the mounting plate of the positioning mechanism. Rotating the shaft may include rotating the shaft about the actuator axis.

The mounting plate may include an indicator mark. The indicator mark may indicate a position of the shift collar along the axis.

Installing the positioning mechanism in place of the actuator may include positioning the shaft of the positioning mechanism with respect to the mounting plate of the positioning mechanism. Positioning the shaft of the positioning mechanism with respect to the mounting plate may occur before installing the positioning mechanism in place of the actuator.

Positioning the shaft with respect to the mounting plate may include inserting the shaft into a hole in the mounting plate at a designated rotational position.

Securing the positioning mechanism may inhibit movement of the shift collar along an axis. Securing the positioning mechanism may hold the shift collar in a neutral position. A transmission of the axle assembly may be decoupled from a differential assembly of the axle assembly when the shift collar is in the neutral position.

BRIEF DESCRIPTION OF THE DRAWINGS

FIG. 15 is a perspective view of another example of a positioning mechanism.

FIG. 16 is an exploded view of the positioning mechanism of FIG. 15.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting, As used in the description of the various described embodiments and the appended claims, the singular forms "a" "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
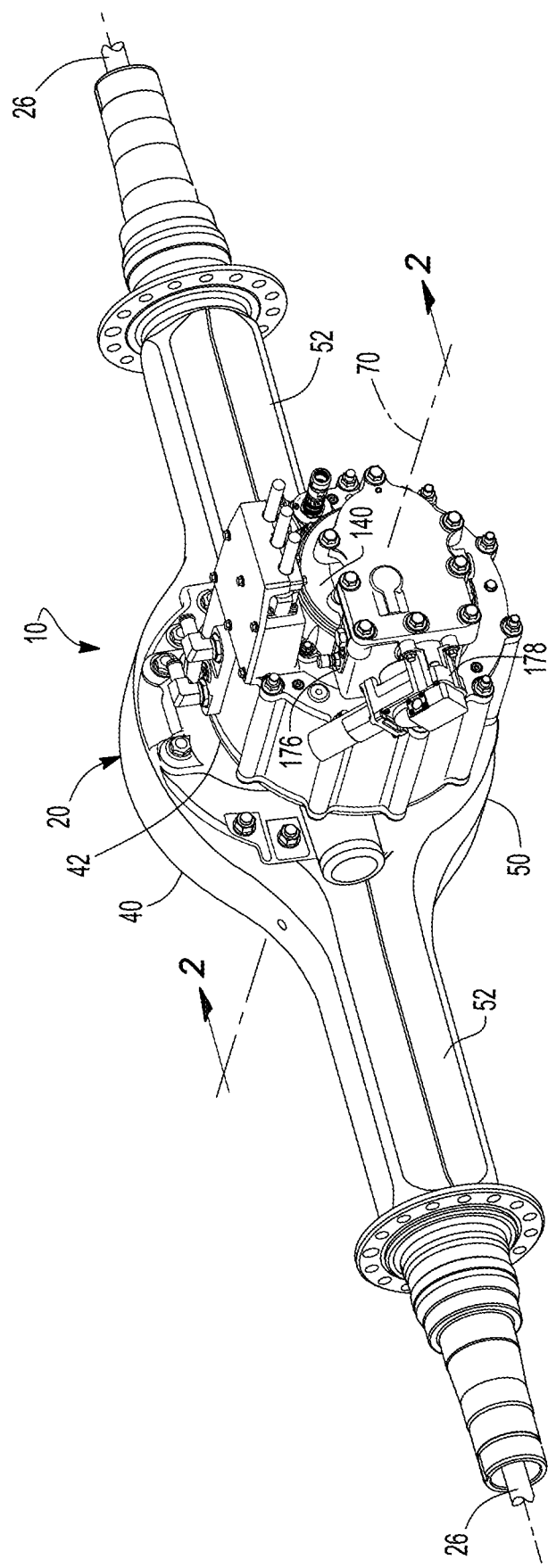
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 is configured to provide torque to one or more traction wheel assemblies that may include a tire mounted on a wheel. The wheel may be mounted to a wheel hub that may be rotatable about a wheel axis.

Figure 2:
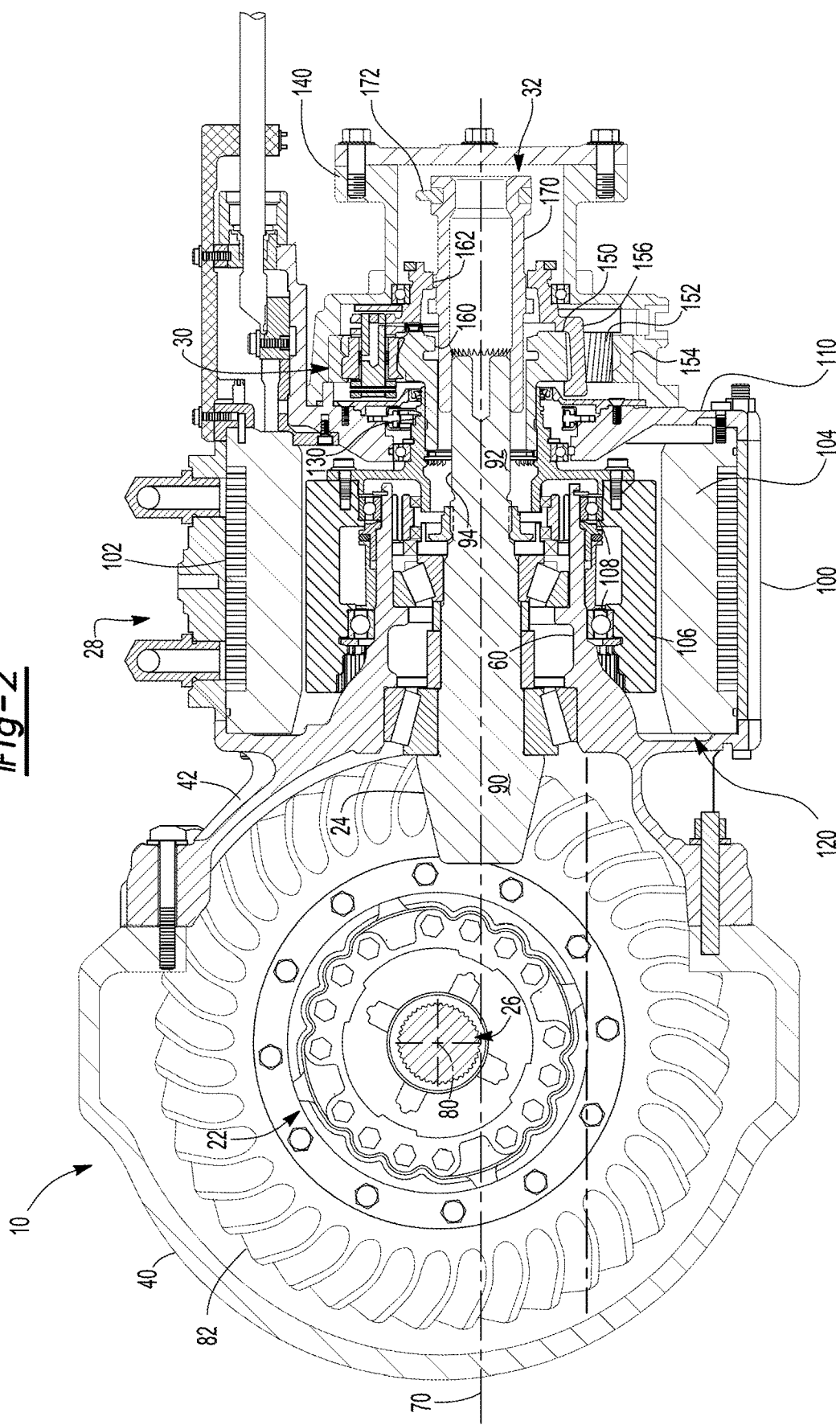
FIG. 2 is a section view of the axle assembly along section line 2-2 showing an example of a shift collar in a first position.

One or more axle assemblies may be provided with the vehicle. A single axle assembly is shown in FIGS. 1 and 2. The axle assembly 10 includes an axle housing assembly 20 as is best shown in FIG. 1. As is best shown, the axle assembly 10 may include a differential assembly 22, a drive pinion 24, at least one axle shaft 26, an electric motor module 28, a transmission module 30, a shift mechanism 32, or combinations thereof. As is best shown in FIGS. 7, 13, 15, and 17, a positioning mechanism 34, 34', 34'', 34''' is mountable to the axle assembly 10 to secure or facilitate positioning of the shift mechanism 32.

The axle assembly 10 may be provided in various configurations. The axle assembly will primarily be described in the context of a configuration in which the electric motor module 28 is positioned between the differential assembly 22 and the transmission module 30; however, it is to be understood that the axle assembly may be provided in other configurations, such as a configuration in which the differential assembly is positioned between the electric motor module and the transmission module or in which the electric motor module is remotely positioned from the axle assembly rather than being part of the axle assembly. In addition, the transmission module 30 is primarily discussed in the context of a configuration that has a planetary gear set; however, it is to be understood that the transmission module may be of any suitable type and may have a configuration that does not have a planetary gear set.

Axle Housing Assembly

Referring to FIG. 1, the axle housing assembly 20 receives various components of the axle assembly 10. In addition, the axle housing assembly 20 may facilitate mounting of the axle assembly 10 to the vehicle. In at least one configuration, the axle housing assembly 20 may include an axle housing 40 and a differential carrier 42.

The axle housing 40 may receive and may support the axle shafts 26. In at least one embodiment, the axle housing 40 may include a center portion 50 and at least one arm portion 52.

The center portion 50 is disposed proximate the center of the axle housing 40. The center portion 50 may define a cavity that may receive the differential assembly 22. A lower region of the center portion 50 may at least partially define a sump portion that may contain or collect lubricant.

Referring to FIG. 1, one or more arm portions 52 may extend from the center portion 50. For example, two arm portions 52 may extend in opposite directions from the center portion 50 and away from the differential assembly 22. The arm portions 52 may have similar configurations. For example, the arm portions 52 may each have a hollow tubular configuration that may extend around and may receive a corresponding axle shaft 26 and may help separate or isolate the axle shaft 26 or a portion thereof from the surrounding environment. An arm portion 52 or a portion thereof may be integrally formed with the center portion 50. It is also contemplated that the arm portions 52 may be omitted.

Referring to FIGS. 1 and 2, the differential carrier 42 is configured to support the differential assembly 22. For example, the differential carrier 42 may include one or more bearing supports that may support a bearing like a roller bearing assembly that may rotatably support the differential assembly 22. The differential carrier 42 may be mounted to the center portion 50 of the axle housing 40. The differential carrier 42 may also facilitate mounting of the electric motor module 28. In at least one configuration, the differential carrier 42 may include a bearing support wall 60, which is best shown in FIG. 2.

The bearing support wall 60 may support bearings that may rotatably support other components of the axle assembly 10. For example, the bearing support wall 60 may support a bearing that may rotatably support the drive pinion 24, a bearing that may rotatably support a rotor of the electric motor module 28, or both. The bearing support wall 60 may extend in an axial direction away from the axle housing 40 and may extend around the axis 70. The bearing support wall 60 may define a hole that may extend along or around the axis 70 and receive the drive pinion 24 and the bearings that rotatably support the drive pinion 24. The bearing support wall 60 may be integrally formed with the differential carrier 42 or may be a separate component that is fastened to the differential carrier 42.

Differential Assembly, Drive Pinion, and Axle Shafts

Referring to FIG. 2, the differential assembly 22 is rotatable about a differential axis 80 and is configured to transmit torque to the axle shafts 26 and wheels. The differential assembly 22 is operatively connected to the axle shafts 26 and may permit the axle shafts 26 and wheels to rotate at different rotational speeds in a manner known by those skilled in the art. The differential assembly 22 may be partially received in the center portion 50 of the axle housing assembly 20. The differential assembly 22 may have a ring gear 82 that may have teeth that mate or mesh with the teeth of the drive pinion 24. Accordingly, the differential assembly 22 may receive torque from the drive pinion 24 via the ring gear 82 and transmit torque to the axle shafts 26.

The drive pinion 24 may operatively connect the transmission module 30 to the differential assembly 22. As such, the drive pinion 24 may transmit torque between the differential assembly 22 and the transmission module 30. In at least one configuration, the drive pinion 24 may be rotatable about the axis 70 and may be rotatably supported inside another component, such as the bearing support wall 60. The drive pinion 24 may include a gear portion 90 and a shaft portion 92.

The gear portion 90 has a plurality of teeth that may mate with corresponding teeth on the ring gear 82. The gear portion 90 may be integrally formed with the shaft portion 92 or may be provided as a separate component that may be fixedly disposed on the shaft portion 92.

The shaft portion 92 extends from the gear portion 90. For instance, the shaft portion 92 may extend away from the axle housing 40 and may have a spline 94 that mates with a corresponding spline on a shift collar 170 of the shift mechanism 32 as will be discussed in more detail below.

Referring to FIG. 1, the axle shafts 26 are configured to transmit torque between the differential assembly 22 and corresponding wheel hubs and wheels. Two axle shafts 26 may be provided such that each axle shaft 26 extends through a different arm portion 52 of axle housing 40. The axle shafts 26 may extend along and may be rotatable about an axis, such as the differential axis 80. Each axle shaft 26 may have a first end and a second end. The first end may be operatively connected to the differential assembly 22. The second end may be disposed opposite the first end and may be operatively connected to a wheel. Optionally, gear reduction may be provided between an axle shaft 26 and a wheel.

Electric Motor Module

Referring to FIG. 2, the electric motor module 28, which may also be referred to as an electric motor, is configured to provide propulsion torque. The electric motor module 28 is operatively connectable to the differential assembly 22. For instance, the electric motor module 28 may configured to provide torque to the differential assembly 22 via the transmission module 30 and the drive pinion 24 as will be discussed in more detail below. In at least one configuration, the electric motor module 28 may be mounted to the differential carrier 42 and may be primarily or completely disposed outside the differential carrier 42. The electric motor module 28 may include a motor housing 100, a coolant jacket 102, a stator 104, a rotor 106, and at least one rotor bearing assembly 108. The electric motor module 28 may also include a motor cover 110.

The motor housing 100 facilitates mounting of the electric motor module 28. In the configuration shown, the motor housing 100 extends between the differential carrier 42 and the motor cover 110. The motor housing 100 may extend around the axis 70 and may define a motor housing cavity 120. The bearing support wall 60 of the differential carrier 42 may be located inside the motor housing cavity 120.

The coolant jacket 102 facilitates cooling or heat removal, such as cooling of the stator 104. The coolant jacket 102 may be received in the motor housing cavity 120 of the motor housing 100.

The stator 104 is received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 extends around and is rotatable about an axis, such as axis 70. In addition, the rotor 106 may extend around and may be supported by the bearing support wall 60. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104.

One or more rotor bearing assemblies 108 rotatably support the rotor 106. For example, a rotor bearing assembly 108 may extend around and receive the bearing support wall 60 of the differential carrier 42 and may be received inside of the rotor 106. The rotor 106 may be operatively connected to the drive pinion 24. For instance, a coupling such as a rotor output flange 130 may operatively connect the rotor 106 to the transmission module 30, which in turn may be operatively connectable to the drive pinion 24.

The motor cover 110 may be mounted to the motor housing 100 and may be disposed opposite the axle housing 40 and the differential carrier 42. The motor cover 110 may be integrated with the transmission module 30 or may be a separate component.

Transmission Module

Referring to FIG. 2, the transmission module 30 is configured to transmit torque between the electric motor module 28 to the differential assembly 22. Torque transmission may be bidirectional. As such, the transmission module 30 may be operatively connected to the electric motor module 28 and the differential assembly 22.

The transmission module 30 may be received in a housing 140. The housing 140 receives the shift mechanism 32 or a portion thereof. In at least one configuration, the housing 140 may be mounted to the motor cover 110.

The transmission module 30 may provide gear reduction and multiple gear ratios between the rotor 106 and the drive pinion 24. The transmission module 30 may be of any suitable type. For instance, the transmission module 30 may include a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. Nos. 11,038,396 and 11,428,297. The disclosures of the references in the preceding three sentences are hereby incorporated in their entirety by reference herein.

Figure 3:
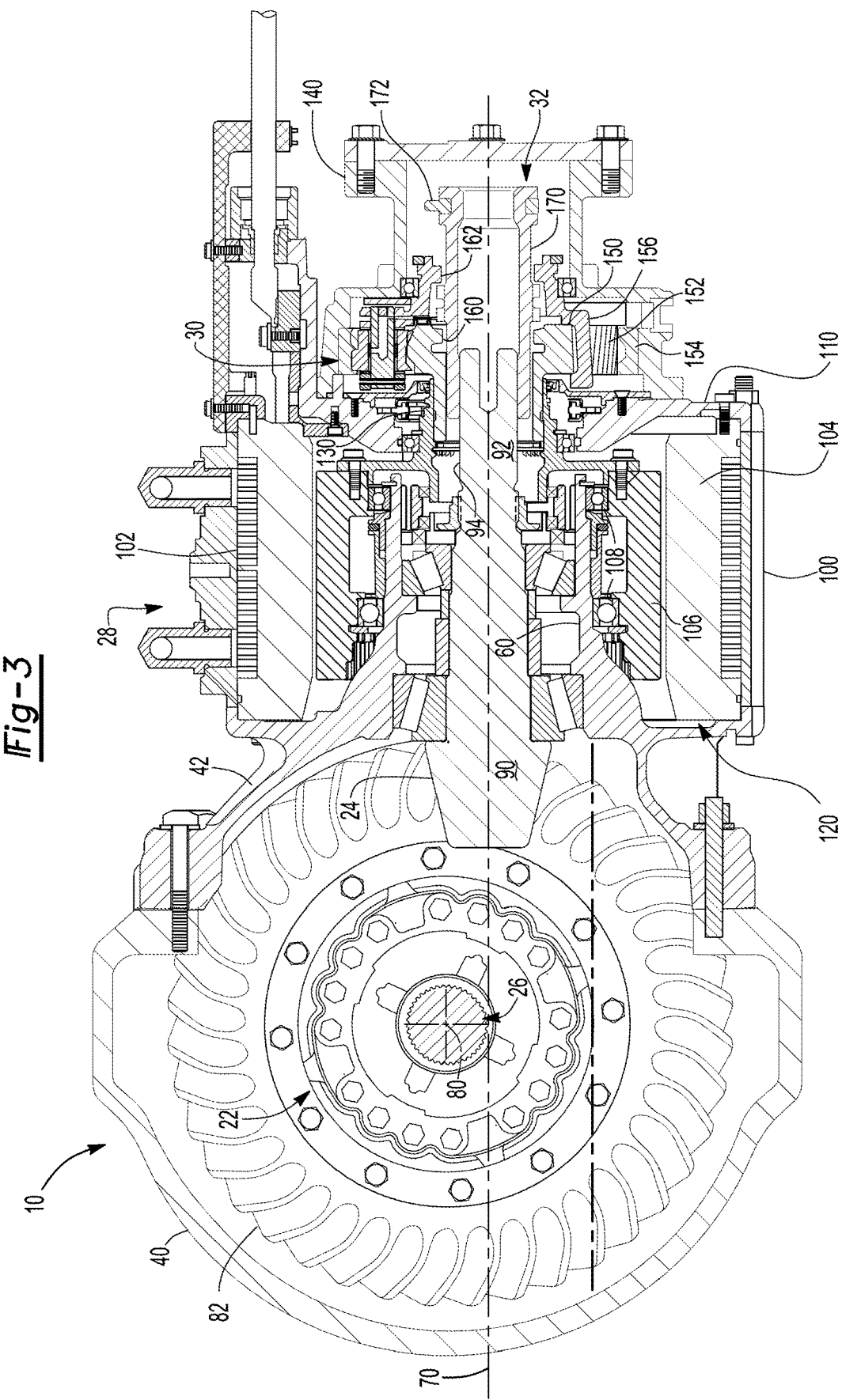
FIG. 3 is a section view of the axle assembly showing the shift collar in a second position.
Figure 4:
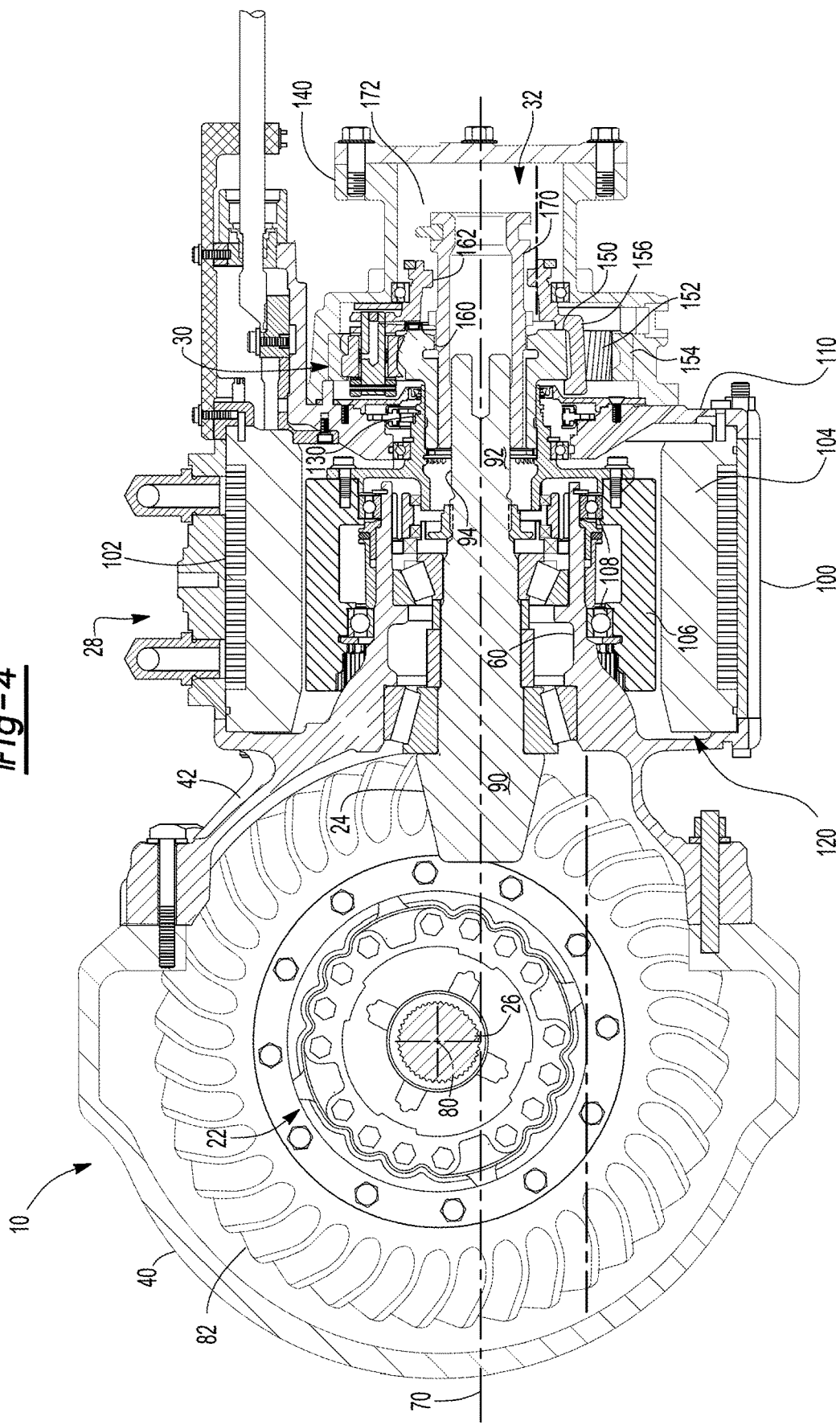
FIG. 4 is a section view of the axle assembly showing the shift collar in a third position.

Referring to FIGS. 2-4, an example of a transmission module 30 that has a planetary gear set is shown. In such a configuration, the transmission module 30 may include a sun gear 150, planet gears 152, a planetary ring gear 154, and a planet gear carrier 156.

The sun gear 150 is rotatable about the axis 70. The sun gear 150 may be operatively connectable to the electric motor module 28. The sun gear 150 may have teeth that face away from the axis 70 that mesh with the teeth of the planet gears 152 and an internal gear portion 160 that has teeth that extend toward the axis 70 that selectively mate or mesh with teeth of a shift collar as will be discussed in more detail below.

The planet gears 152 are rotatably disposed between the sun gear 150 and the planetary ring gear 154. The planet gears 152 have teeth that face away from the axis 70 and mesh with teeth of the sun gear 150 and teeth of the planetary ring gear 154.

The planetary ring gear 154 extends around the axis 70. The planetary ring gear 154 may be stationary with respect to the axis 70. For example, the planetary ring gear 154 may be received in and may be fixedly disposed on or with respect to the housing 140.

The planet gear carrier 156 is rotatable about the axis 70 and rotatably supports the planet gears 152. In at least one configuration, the planet gear carrier 156 may include a planet gear carrier gear portion 162 that has teeth that are arranged around the axis 70 and may extend toward the axis 70.

Shift Mechanism

Referring to FIG. 2, the shift mechanism 32 cooperates with the transmission module 30 to provide a desired gear reduction ratio to change the torque provided from the electric motor module 28 to the differential assembly 22, and hence to the axle shafts 26 of the axle assembly 10. For example, the transmission module 30 may provide a first drive gear ratio and a second drive gear ratio. The first drive gear ratio, which may be referred to as a low range gear ratio, may provide gear reduction from the electric motor module 28 to the differential assembly 22 and hence to the axle shafts 26. As a nonlimiting example, the first drive gear ratio may provide a 2:1 gear ratio or more. The first drive gear ratio may provide increased torque to a vehicle traction wheel as compared to the second drive gear ratio.

The second drive gear ratio, which may be referred to as a high range gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy.

In addition, a neutral position or neutral drive gear ratio may be provided in which torque may not be provided to the differential assembly 22 by the electric motor module 28. As such, torque may not be transmitted between the transmission module 30 and the drive pinion 24 when a shift collar is in the neutral position.

Figure 5:
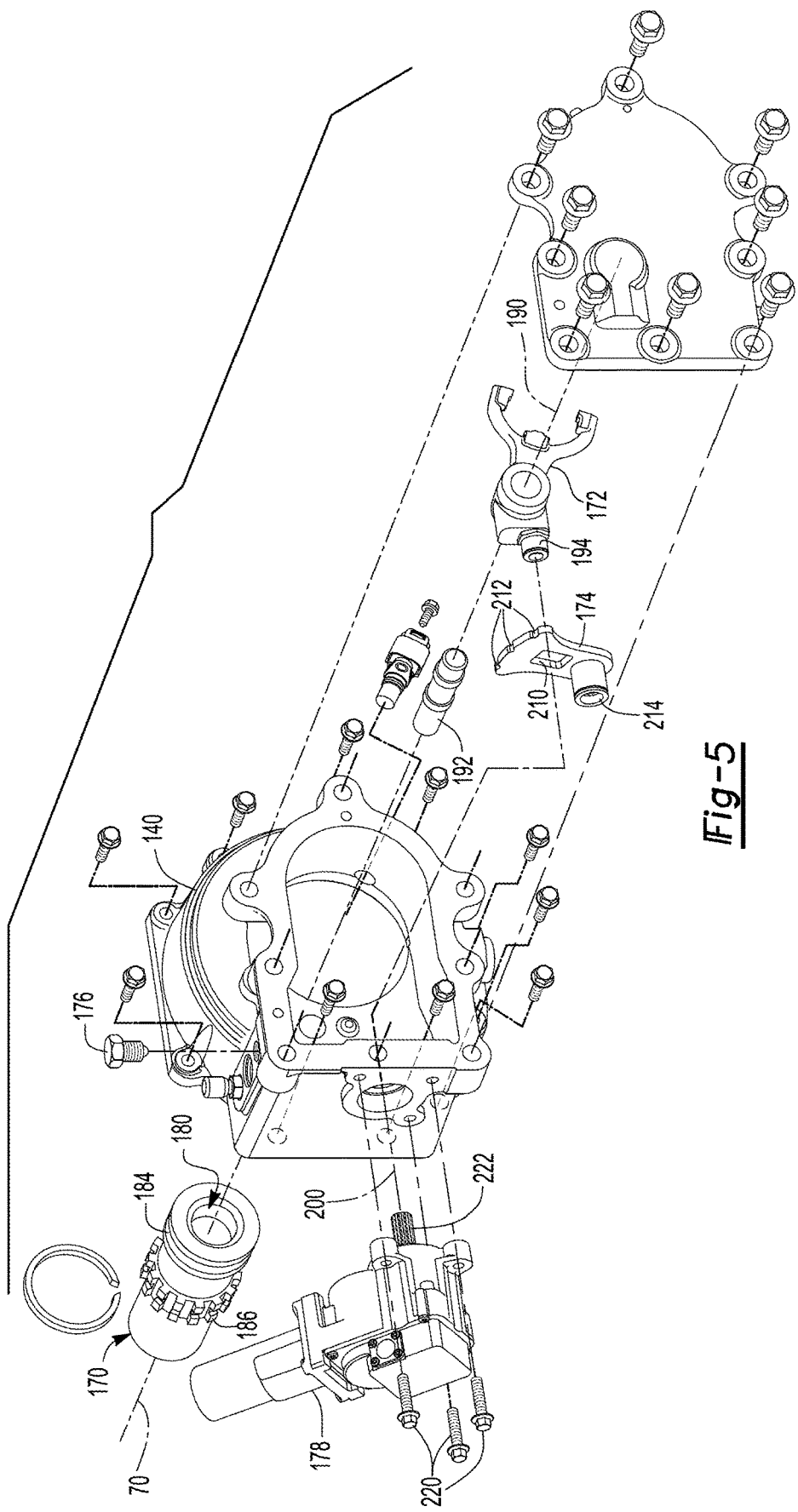
FIGS. 5 and 6 are exploded views of a portion of the axle assembly of FIG. 1.
Figure 6:
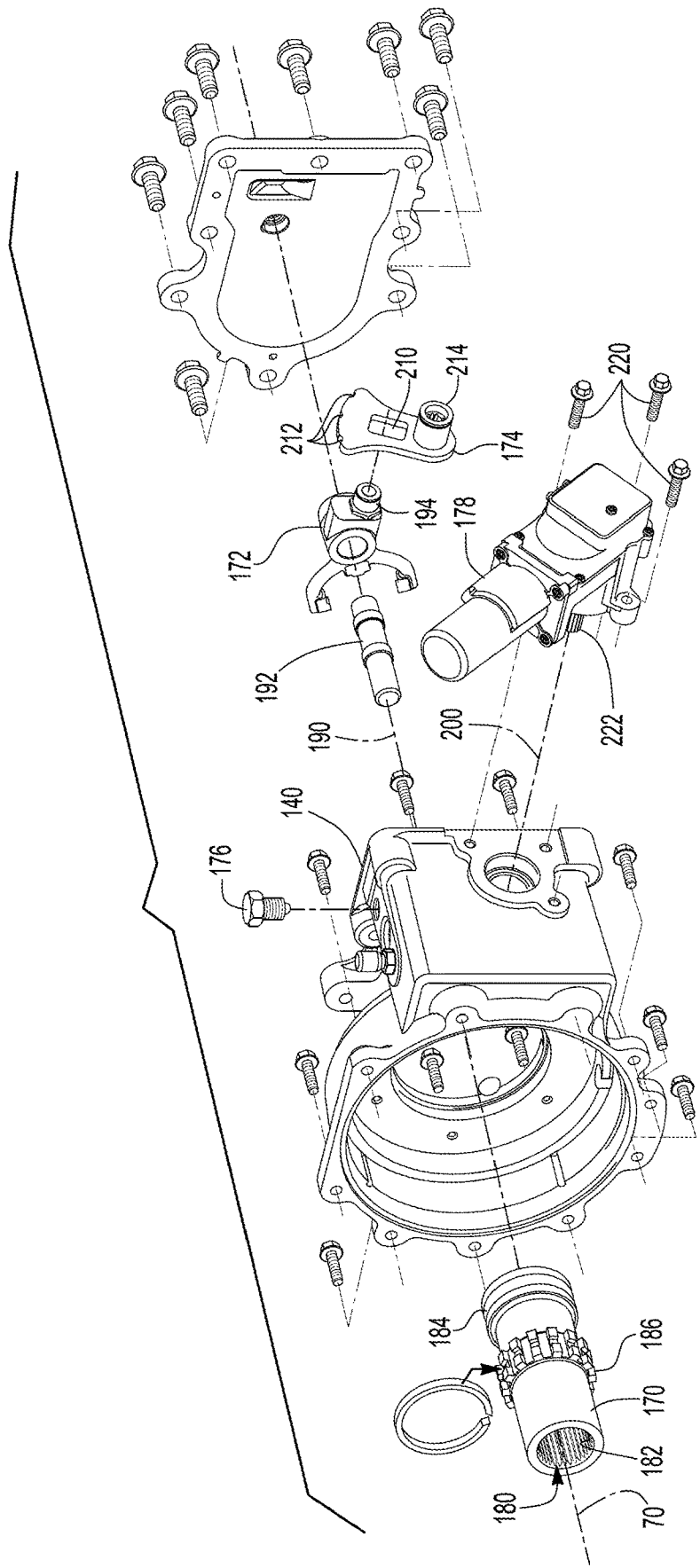

Referring to FIGS. 5 and 6, the shift mechanism 32 may be received in the housing 140 and may include a shift collar 170, a shift fork 172 or other linkage, a cam 174, a detent mechanism 176, and an actuator 178.

The shift collar 170 is moveable along the axis 70 to provide a desired gear ratio as will be discussed in more detail below. In at least one configuration, the shift collar 170 may include a shift collar hole 180, a shift collar spline 182, a shift collar groove 184, and a shift collar gear 186.

The shift collar hole 180 may extend through the shift collar 170 and may extend around the axis 70. The shift collar hole 180 may receive the shaft portion 92 of the drive pinion 24.

The shift collar spline 182 may be disposed in the shift collar hole 180 and may mate with the spline 94 of the drive pinion 24. The mating splines may allow the shift collar 170 to move in an axial direction or along the axis 70 while inhibiting rotation of the shift collar 170 about the axis 70 with respect to the drive pinion 24. Thus, the shift collar 170 may be rotatable about the axis 70 with the drive pinion 24.

The shift collar groove 184 receives the shift fork 172, which connects the shift collar 170 to the cam 174.

The shift collar gear 186 has teeth that may be arranged around the axis 70 and that may extend away from the axis 70.

The shift collar 170 may selectively engage a gear ratio. More specifically, the shift collar 170 may move axially or in a direction that extends along the axis 70 between a first position, a second position, and a third position. Examples of these positions are illustrated in FIGS. 2-4.

Referring to FIG. 2, the shift collar 170 is shown in the first position. In the first position, the shift collar 170 may couple the planet gear carrier 156 to the drive pinion 24. For example, the teeth of the shift collar gear 186 may mesh with the teeth of the planet gear carrier gear portion 162 of the planet gear carrier 156. As such, torque that is provided by the electric motor module 28 may be transmitted through the rotor output flange 130, sun gear 150, planet gears 152, and planet gear carrier 156 to the shift collar 170 and from the shift collar 170 to the drive pinion 24.

Referring to FIG. 3, the shift collar 170 is shown in a second position or neutral position. The second position may be axially positioned between the first position and the third position. In the second position, the shift collar 170 may not couple the transmission module 30 to the drive pinion 24. For example, the teeth of the shift collar gear 186 may not mesh with the sun gear 150 or the planet gear carrier 156. As such, torque is not transmitted between the electric motor module 28 and the differential assembly 22 in the neutral position.

Referring to FIG. 4, the shift collar 170 is shown in the third position. In the third position, the shift collar 170 may couple the sun gear 150 to the drive pinion 24. For example, the teeth of the shift collar gear 186 may mesh with the teeth of the internal gear portion 160 of the sun gear 150. As such, torque that is provided by the electric motor module 28 may be transmitted through the rotor output flange 130 and sun gear 150 to the shift collar 170 and from shift collar 170 to the drive pinion 24. The shift collar 170 may be disposed closer to the axle housing 40 when in the third position than when in the second position.

Referring to FIGS. 5 and 6, the shift fork 172 extends between the shift collar 170 and the cam 174. The shift fork 172 may be moveable along a shift axis 190. For instance, the shift fork 172 may be slidable along a shift rail 192 that extends along the shift axis 190. The shift axis 190 may be disposed substantially parallel to the axis 70. The term "substantially parallel" as used herein means the same as or very close to parallel and includes features or axes that are within ±3° of being parallel each other. The shift fork 172 may have an engagement feature 194 that is configured to engage the cam 174.

The cam 174 directly or indirectly connects the shift fork 172 to the actuator 178. The cam 174 may be rotatable about an actuator axis 200. Rotation of the cam 174 about the actuator axis 200 may move the shift fork 172 along the shift axis 190. In the configuration shown, the engagement feature 194 of the shift fork 172 is offset from the actuator axis 200 and received in a window 210 of the cam 174. The cam 174 may also include one or more detent engagement features 212 and a mounting feature 214. The cam 174 is couplable to either the actuator 178 or the shaft of a positioning mechanism as will be discussed in more detail below.

The detent engagement features 212 are configured to engage the detent mechanism 176. The detent engagement features 212 may have any suitable configuration, such as a male configuration, female configuration, or combinations thereof. In the configuration shown, the detent engagement features 212 are recesses that extend toward the actuator axis 200. In this configuration, there is a first recess that corresponds to the first position of the shift collar 170, a second recess that corresponds to the second (neutral) position, and a third recess that corresponds to the third position.

The mounting feature 214 may facilitate coupling of the cam 174 to another component, such as the actuator 178 or a positioning mechanism 34, 34', 34", 34''', so that the cam 174 is rotatable with another component. The mounting feature 214 may have any suitable configuration. For instance, the mounting feature 214 may have a male configuration, female configuration, or combinations thereof. The mounting feature 214 may be a spline or opening. The mounting feature may be asymmetric. For instance the mounting feature 214 may include splines that are arranged around the actuator axis 200 but may omit a spline tooth or include an enlarged spline tooth so that another component, such as a positioning mechanism 34, 34', 34", 34''', is only mountable to the mounting feature 214 at a particular rotational orientation about the actuator axis 200. The same result may be achieved with asymmetric shapes, such as an asymmetric opening like a D-shaped opening in the cam 174.

The detent mechanism 176 is engageable with the cam 174 to resist rotation of the cam 174 about the actuator axis 200. For instance, the detent mechanism 176 may be received in the first, second, and third recesses of the cam 174 to hold the shift collar 170 in the first, second, and third positions, respectively, when sufficient torque is not exerted on the cam 174 to overcome the resistance exerted by the detent mechanism 176. As such, the detent mechanism 176 may help hold the shift collar 170 in a desired position and may do so independent of the actuator 178 or when the actuator 178 is removed. The detent mechanism 176 may be mounted to the housing 140.

The actuator 178 is configured to exert force to move the shift collar 170 along the axis 70 between the first, second, and third positions. The actuator 178 is removably mounted to the housing 140. For example, the actuator 178 may be attached to the housing 140 with one or more fasteners 220, such as bolts. The actuator 178 may have an output shaft 222 that may be rotatable about the actuator axis 200. The output shaft 222 may be coupled to the cam 174, such as with mating splines or asymmetric mating profiles that allow the output shaft 222 and the cam 174 to rotate together. Rotation of the output shaft 222 rotates the cam 174, which in turn may actuate the shift fork 172 along the shift axis 190, which in turn may move the shift collar 170 along the axis 70. The actuator 178 may be of any suitable type. For example, the actuator 178 may be an electrical, electromechanical, pneumatic, or hydraulic actuator.

Figure 7:
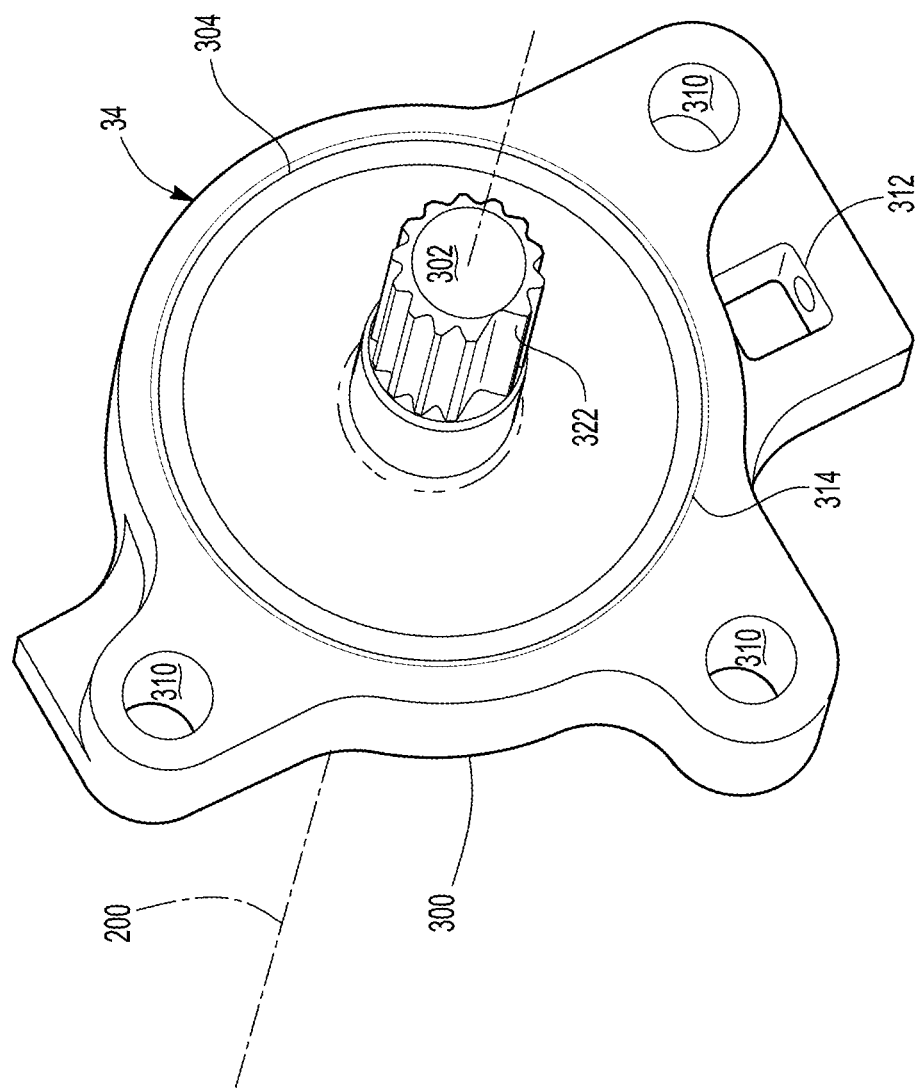
FIG. 7 is a perspective view of an example of a positioning mechanism that positions the shift collar.

Referring to FIG. 7, an example of a positioning mechanism 34 is shown. The positioning mechanism 34 may be used to hold the shift collar 170 in a desired position along the axis 70. For instance, the positioning mechanism 34 may hold the shift collar 170 in the first position, the second position, or the third position. In addition, the positioning mechanism 34 may be moveable to move the shift collar 170 to a desired position along the axis 70. In at least one configuration, the positioning mechanism 34 may include a mounting plate 300, a shaft 302, a seal 304, or combinations thereof.

The mounting plate 300 facilitates mounting of the positioning mechanism 34 to the axle assembly 10. In addition, the mounting plate 300 may facilitate movement and holding of the shift collar 170 as will be discussed in more detail below. In at least one configuration, the mounting plate 300 may have a footprint or mounting configuration that is the same as or compatible with the actuator 178. As such, the mounting plate 300 may be installable on the housing 140 in place of the actuator 178. In the configuration shown, the mounting plate 300 includes three through holes 310; however, it is contemplated that a greater or lesser number of through holes may be provided. In addition, the mounting plate 300 may optionally include a tool attachment feature 312, groove 314, or both.

The tool attachment feature 312 may facilitate attachment or coupling of a tool to the mounting plate 300. In the configuration shown, the tool attachment feature 312 has a female configuration; however it is contemplated that the tool attachment feature 312 may have a male configuration or combinations of male and female configurations.

The groove 314 is configured to receive the seal 304, such as an O-ring, that may facilitate sealing between the mounting plate 300 and the axle assembly 10. For instance, the seal 304 may be partially received in the groove 314 and may extend from the mounting plate 300 to the housing 140 to inhibit contaminants from entering the axle assembly 10 and to help retain lubricant inside the axle assembly 10.

The shaft 302 extends from the mounting plate 300. For example, the shaft 302 may extend from a side of the mounting plate 300 that is configured to face toward the axle assembly 10 when the positioning mechanism 34 is installed in place of the actuator 178. The shaft 302 may be integrally formed with the mounting plate 300 or may be a separate component that is attached to the mounting plate 300. The shaft 302 may extend along an axis, such as the actuator axis 200 when the positioning mechanism 34 is installed. For convenience in reference, the axis is primarily discussed as being the actuator axis 200 below, but it is to be understood that the axis may differ from the actuator axis 200 when the positioning mechanism is not installed on the axle assembly 10. In at least one configuration, the shaft 302 may include a plurality of spline teeth 322.

The spline teeth 322 may be arranged around the actuator axis 200 and may extend away from the actuator axis 200. In the configuration shown, the spline teeth 322 are arranged in a repeating pattern with the exception of the omission of one spline tooth. This configuration may cooperate with the mounting feature 214 of the cam 174 to permit the shaft 302 to be inserted into the hole in the cam 174 at a specific rotational orientation or single rotational position about the actuator axis 200. For instance, the mounting feature 214 of the cam 174 may be provided with an enlarged spline tooth that may only be insertable at the location where the spline tooth has been omitted from the shaft 302.

Referring to FIGS. 8-12, an example of a method of controlling the axle assembly 10 using the positioning mechanism 34 is shown.

As an overview, in an axle assembly that is driven with an electric motor there are times in which it is desirable to hold the shift collar in a predetermined position and prevent shifting of the shift collar. For instance, when a vehicle having an axle assembly that is driven with an electric motor needs to be towed, it may be desirable to move the shift collar to the neutral position and secure the shift collar accordingly. Securing the shift collar in the neutral position decouples the differential assembly from the transmission, which reduces rolling resistance since the transmission and rotor are decoupled from the vehicle wheels. The electric motor does not function as a generator when it is decoupled from the wheel vehicle wheels, which may help avoid unintended current flow to electrical components. Securing the shift collar in the neutral position may also prevent the shift collar from reengaging a gear ratio in a configuration that does not have a detent mechanism or when the detent mechanism does not function to inhibit rotation of the cam and hence does not inhibit axial movement of the shift collar.

It may also be desirable in some instances to move the shift collar to engage a gear ratio and to secure the shift collar accordingly. Doing so may allow the vehicle having the axle assembly to operate in a "limp home" mode in which the axle assembly is operative in a limited capacity and shifting of the axle assembly to a different gear ratio is prevented.

The example shown in FIGS. 8-12 is discussed in the context of a positioning mechanism that holds the shift collar in a neutral position; however, it is contemplated that the positioning mechanism could alternatively hold the shift collar "in gear" or in a position in which the shift collar connects the transmission to the drive pinion to provide a desired gear ratio. For instance, the shift collar could be moved (if necessary) to the first position or third position previously discussed and secured to prevent movement to a different position.

Figure 8:
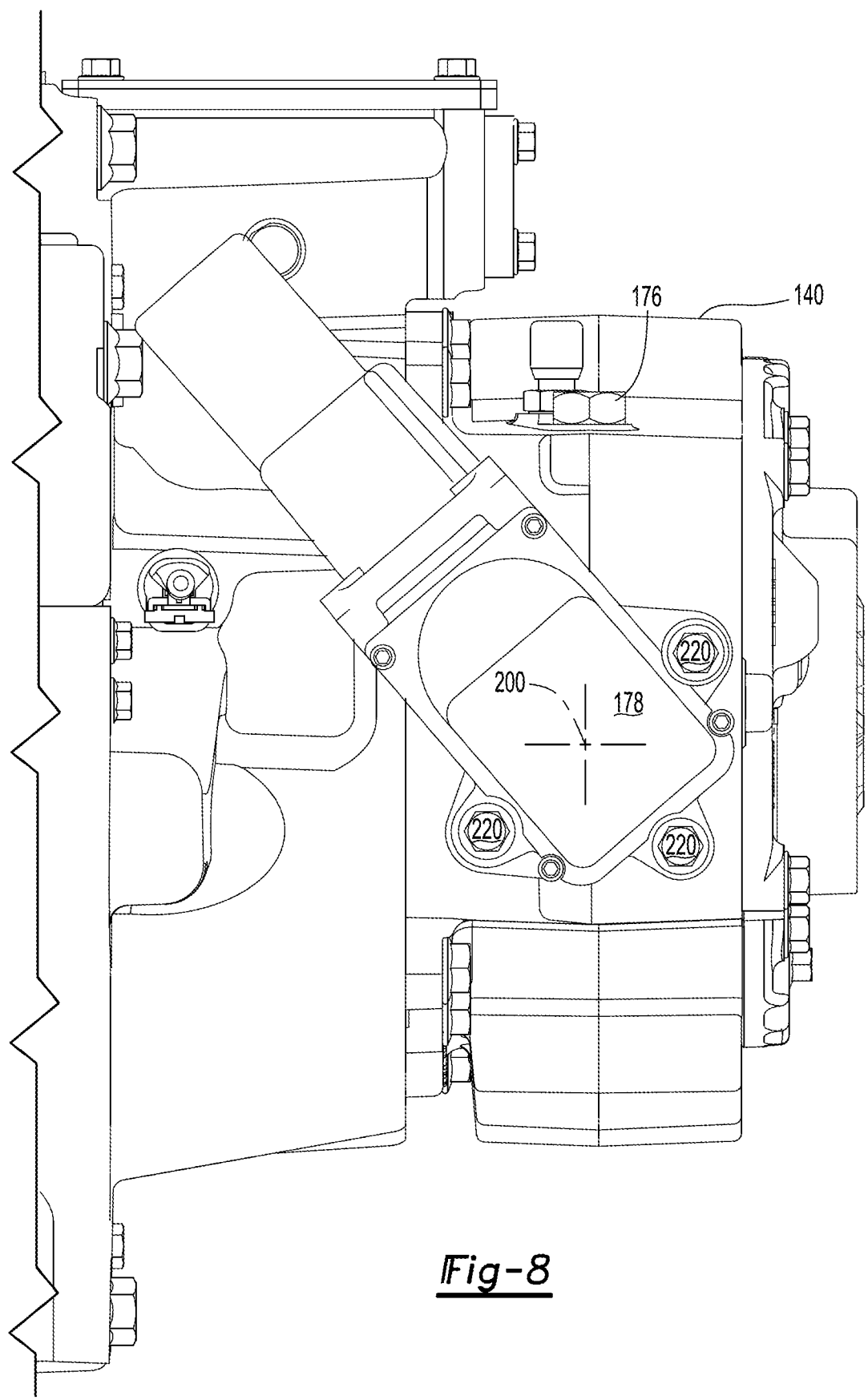
FIG. 8 is a side view of a portion of the axle assembly showing an actuator.

In FIG. 8, a side view of a portion of the axle assembly 10 is shown with the actuator 178 mounted to the housing 140 and secured with three fasteners 220 configured as bolts.

Figure 9:
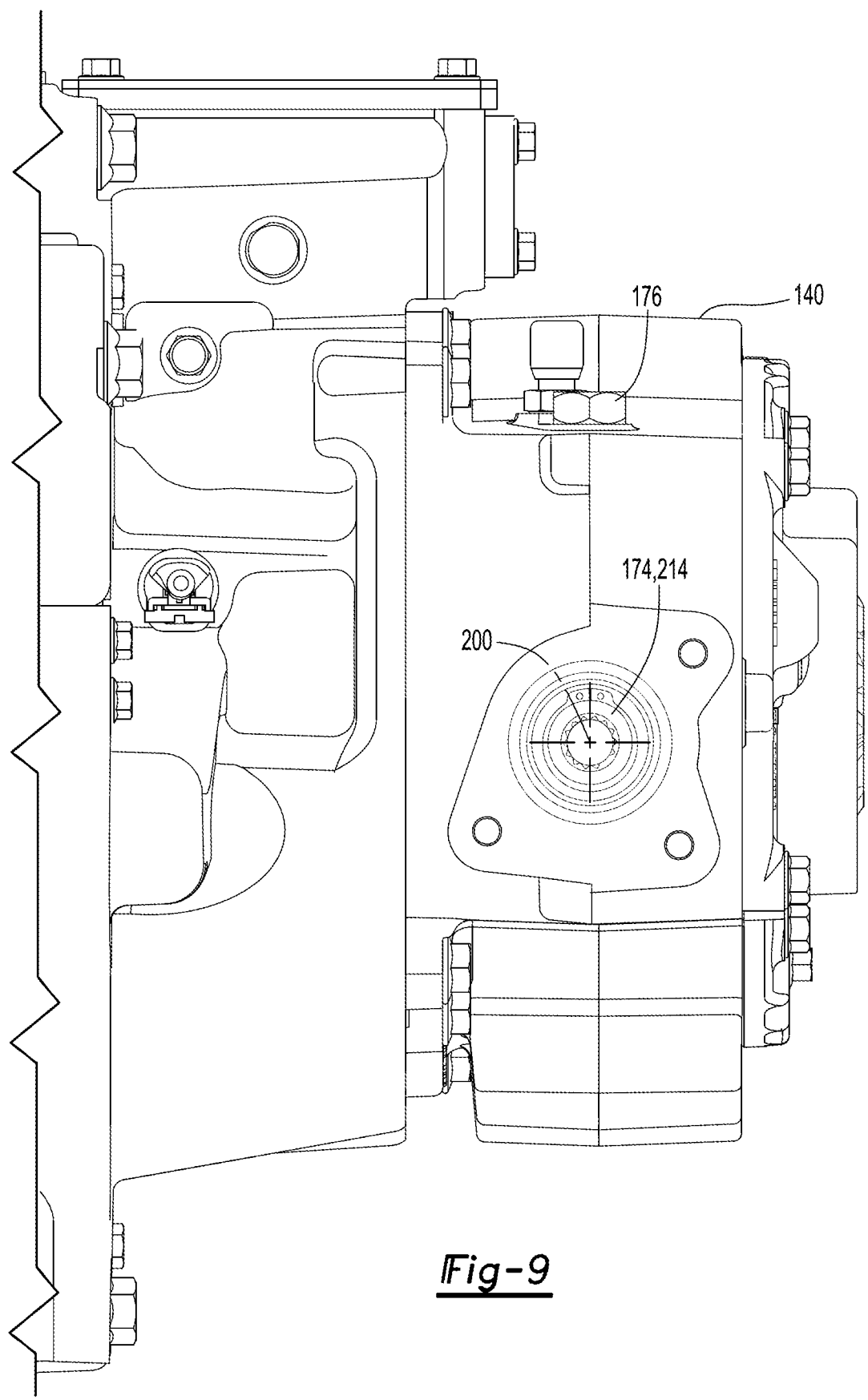
FIG. 9 is a side view of a portion of the axle assembly with the actuator removed.

In FIG. 9, the actuator 178 is removed from the housing 140 of the axle assembly 10. The actuator 178 may be removed from the housing 140 by removing the fasteners 220. Fasteners 220 configured as threaded fasteners may be removed by rotating the fasteners 220 to unthread the fasteners 220 from a corresponding fastener hole in the housing 140 or to unthread the fasteners 220 from threaded studs that extend from the housing 140. Then, the actuator 178 may be removed or disengaged from the housing 140 by moving the actuator 178 along the actuator axis 200 in a direction that extends away from the axle assembly 10 and the housing 140. As a result, the output shaft 222 of the actuator 178 may disengage the cam 174. For example, the output shaft 222 may move along the actuator axis 200 and disengage the mounting feature 214 of the cam 174. Once removed, the actuator 178 may be set aside.

Figure 10:
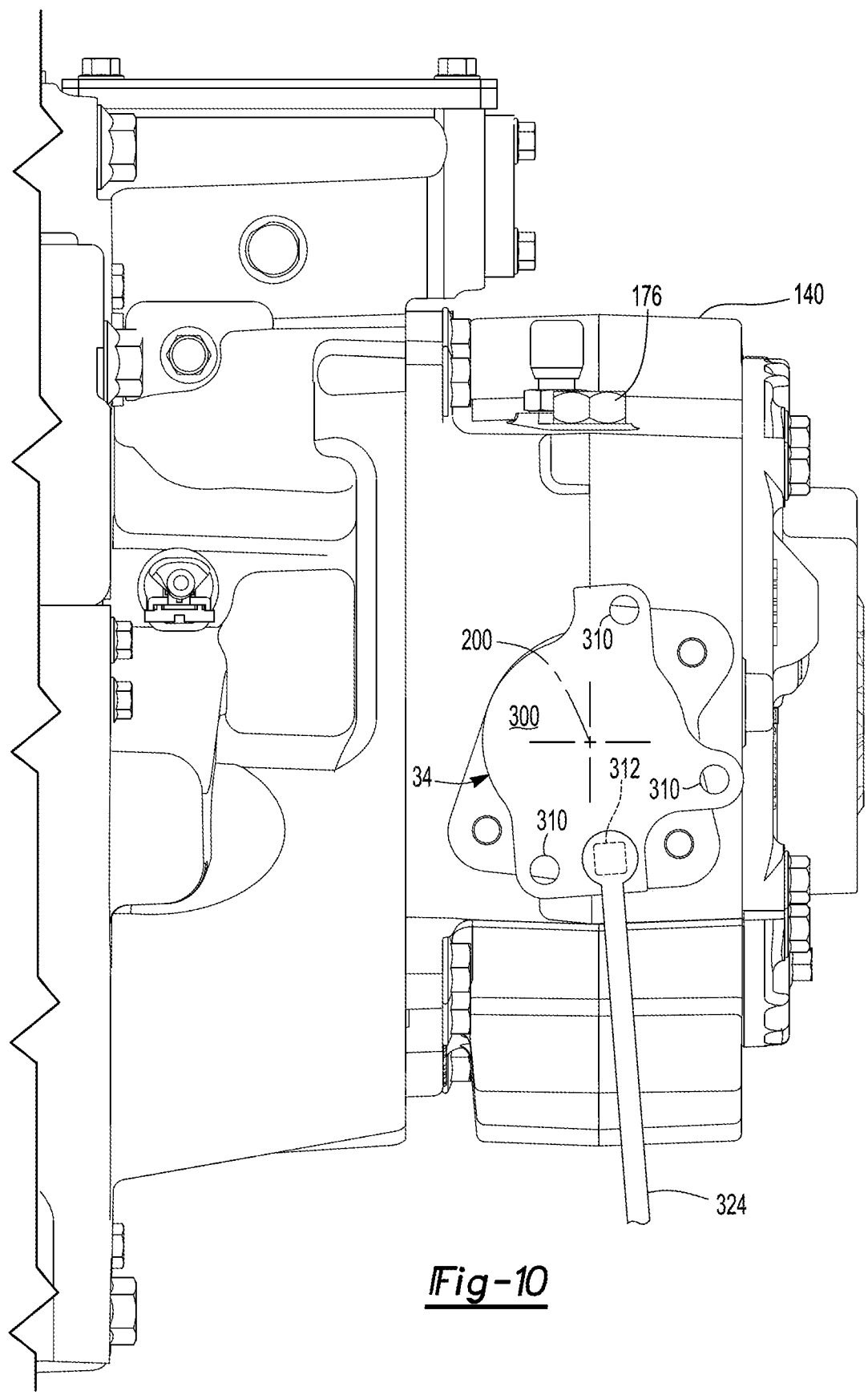
FIG. 10 is a side view of the portion of the axle assembly with the positioning mechanism installed in place of the actuator and in an example of a first rotational position.

In FIG. 10, the positioning mechanism 34 is installed in place of the actuator 178. The positioning mechanism 34 may be installed in place of the actuator 178 by orienting the positioning mechanism 34 such that the shaft 302 is generally aligned with the actuator axis 200 and faces toward the axle assembly 10. In addition, the positioning mechanism 34 may be rotated about the actuator axis 200 to align the spline teeth 322 with the mounting feature 214 in a manner that allows the spline teeth 322 to engage or mate with the mounting feature 214. For instance, the positioning mechanism 34 may be rotated about the actuator axis 200 such that the shaft 302 may be inserted into the hole in the cam 174. Then, the positioning mechanism 34 may be moved along the actuator axis 200 toward the axle assembly 10 to engage the shaft 302 and the cam 174. For example, the positioning mechanism 34 may be moved along the actuator axis 200 to engage the spline teeth 322 and the mounting feature 214.

In the example shown in FIG. 10, the positioning mechanism 34 is illustrated in a rotational position about the actuator axis 200 in which the through holes 310 of the mounting plate 300 are not aligned with the holes in the housing 140. In such a configuration, the positioning mechanism 34 will be rotated about the actuator axis 200 before the positioning mechanism 34 is secured to the axle assembly 10. It is also contemplated that the positioning mechanism 34 may be disposed in a rotational position about the actuator axis 200 in which the through holes 310 of the mounting plate 300 are aligned with the holes of the housing 140, in which case the positioning mechanism 34 need not be rotated about the actuator axis 200 before being secured to the axle assembly 10.

Figure 11:
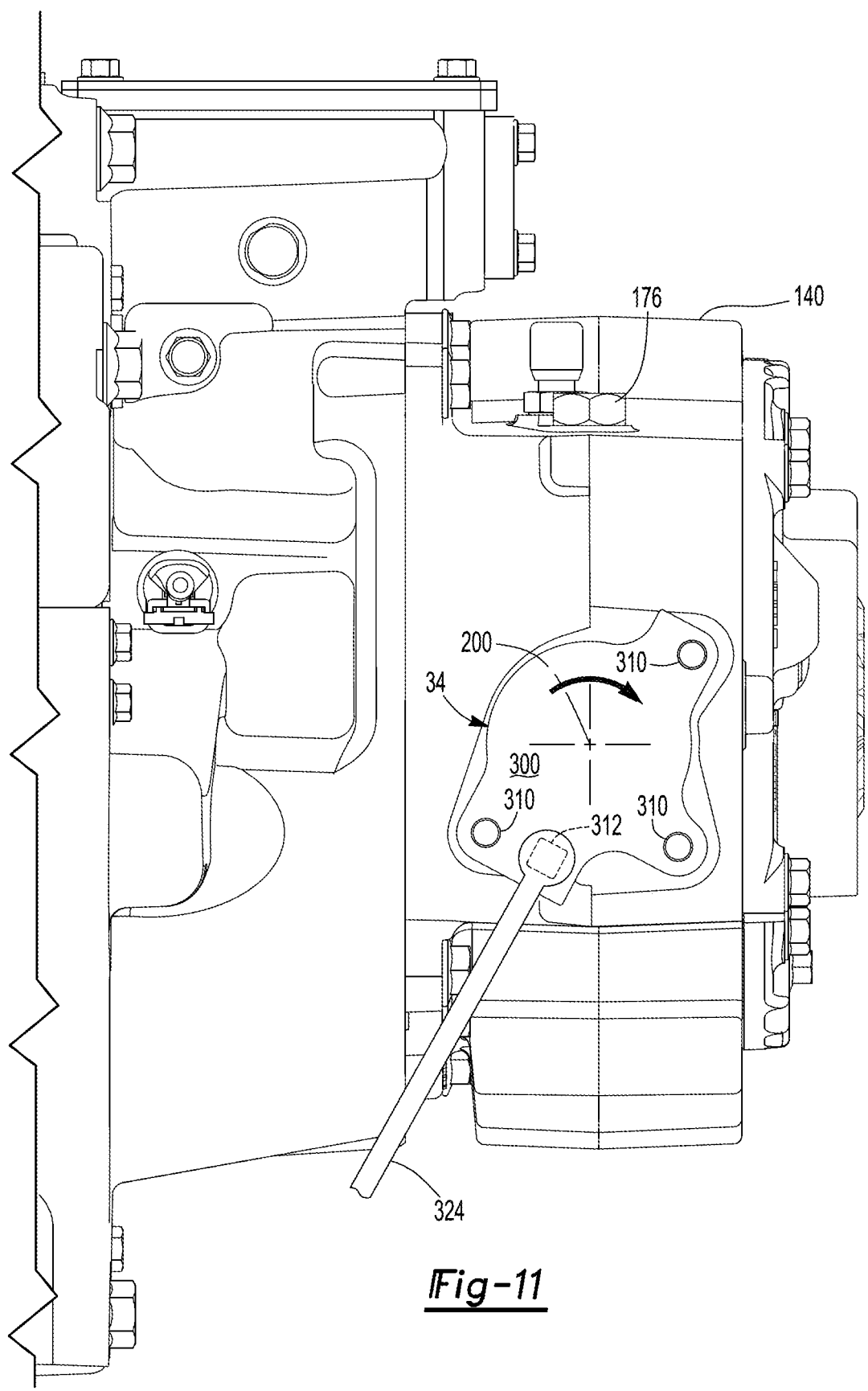
FIG. 11 is a side view of the portion of the axle assembly with the positioning mechanism in a second rotational position.

Referring to FIG. 11, the positioning mechanism 34 is moved after the positioning mechanism 34 is installed in place the actuator 178. Moving the positioning mechanism 34 moves the shift collar 170. In the configuration shown, moving the positioning mechanism 34 includes rotating the positioning mechanism 34 about the actuator axis 200. In the example shown, the positioning mechanism 34 is rotated in a clockwise direction about the actuator axis 200 to move from the position shown in FIG. 10 to the position shown in FIG. 11; however, it is contemplated that the positioning mechanism 34 may be rotated in a counterclockwise direction in other configurations. The positioning mechanism 34 may be rotated by grasping and rotating the mounting plate 300 by hand or by using a tool 324. The tool 324 may be of any suitable type and may have any suitable configuration. For example, the tool 324 may be a lever, wrench, bar, pliers, driver bit, screwdriver, or the like. The tool 324 may be actuated by force that is exerted by a person or force that is exerted by device, such as a power tool that may be electrically or pneumatically powered, such as a drill or wrench. In the example shown, the tool 324 is illustrated as being a lever or socket wrench that is engaged with the tool attachment feature 312 of the mounting plate 300. Force may be exerted with the tool 324 to move the positioning mechanism 34, such as by rotating the positioning mechanism 34 about the actuator axis 200. Movement of the positioning mechanism 34 may not be needed if the positioning mechanism 34 is in a securable position when the positioning mechanism 34 is installed.

Figure 12:
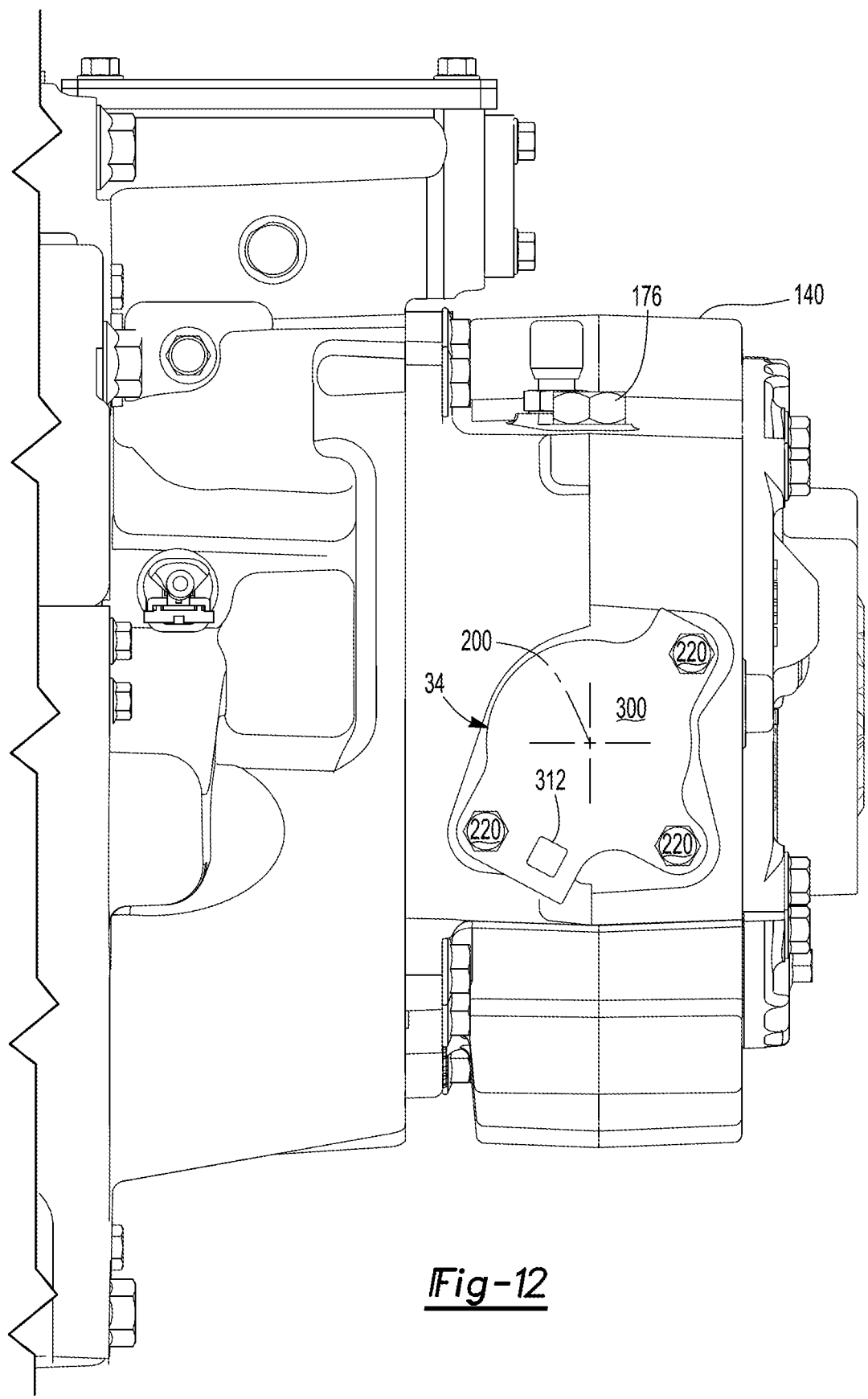
FIG. 12 is a side view of the portion of the axle assembly with the positioning mechanism fastened to a housing of the axle assembly.

Referring to FIG. 12, the positioning mechanism 34 is secured to the axle assembly 10. For instance, the positioning mechanism 34 may be secured to the housing 140 of the axle assembly 10 by reinstalling at least one fastener 220. For instance, a fastener 220 that is configured as a threaded fastener may be inserted through a through hole 310 in the mounting plate 300 and threaded into a corresponding fastener hole in the housing 140 or threaded into engagement with a nut. Securing the positioning mechanism 34 in this manner may prevent the positioning mechanism 34 from rotating about the actuator axis 200 and thus may hold the shift collar 170 such that the shift collar 170 is inhibited from moving along the axis 70. The shift collar 170 may still be free to rotate about the axis 70 with the drive pinion 24 when the positioning mechanism 34 is secured.

Figure 13:
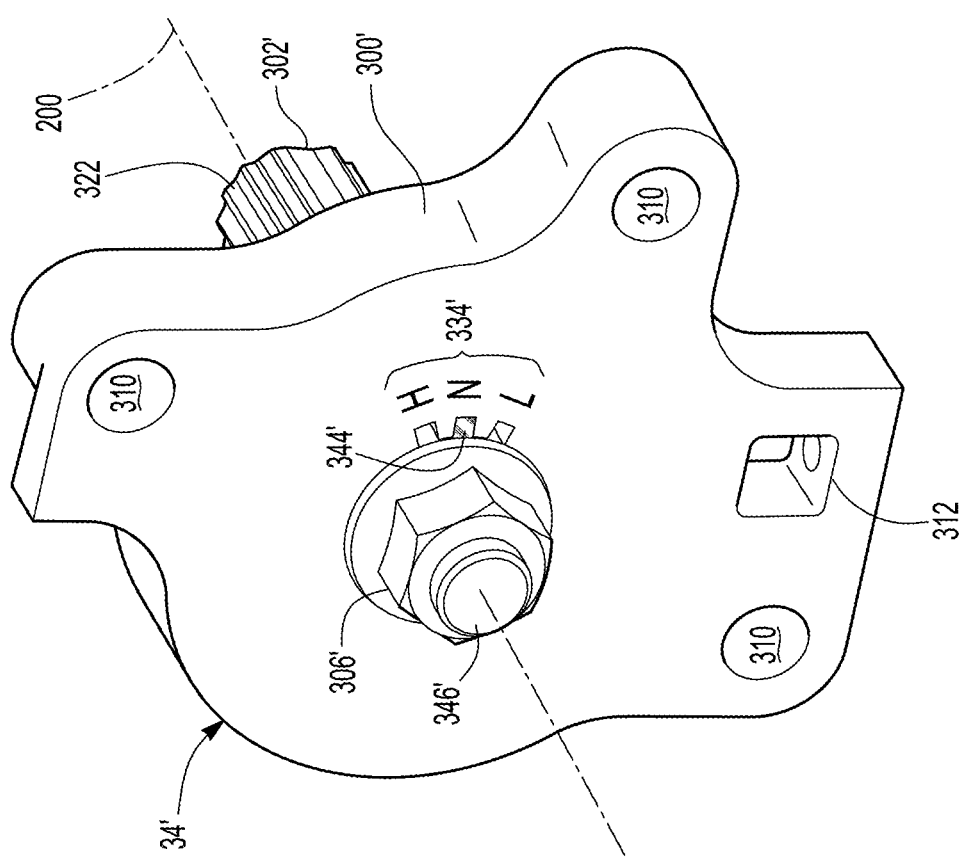
FIG. 13 is a perspective view of another example of a positioning mechanism.
Figure 14:
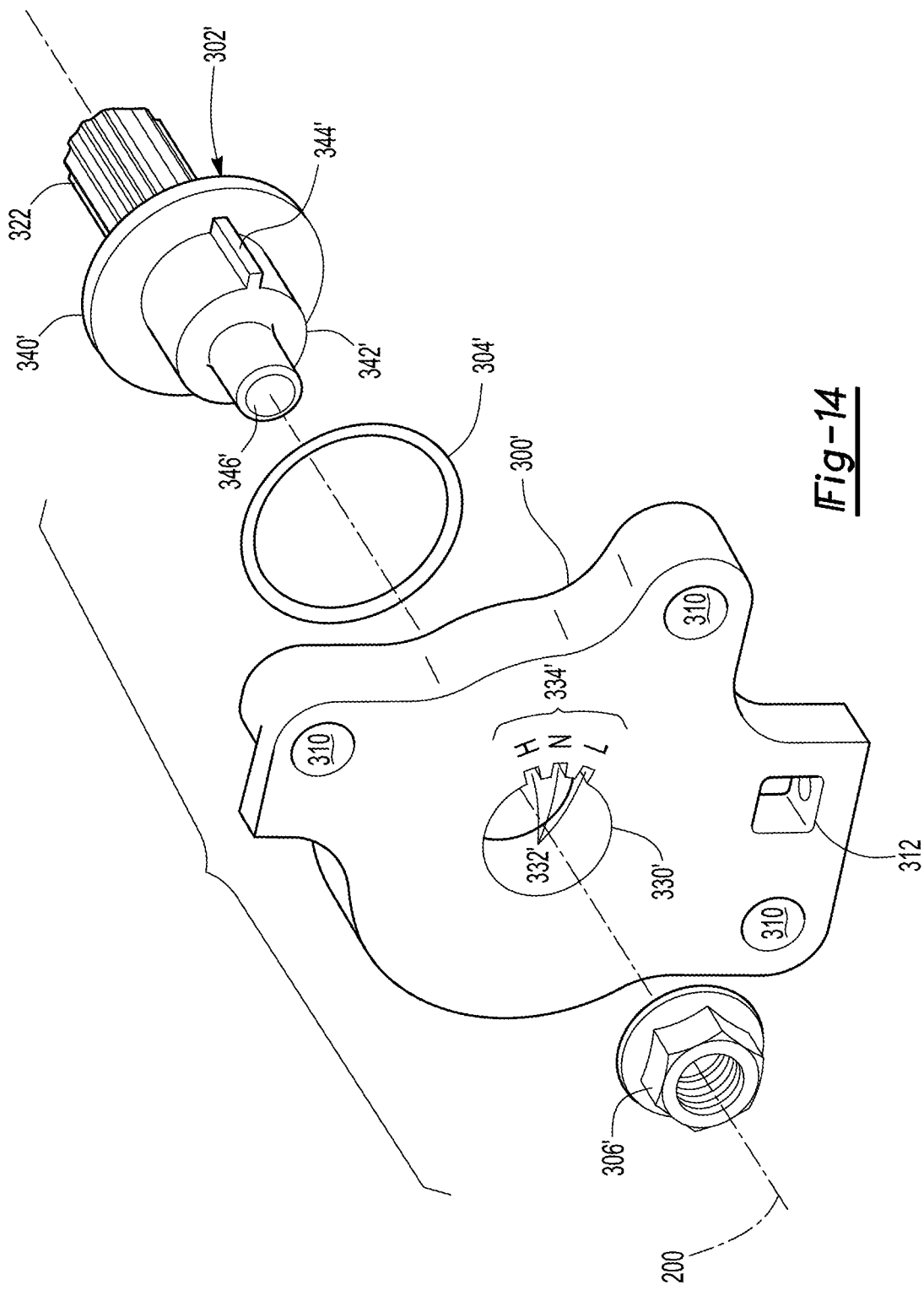
FIG. 14 is an exploded view of the positioning mechanism of FIG. 13.

Referring to FIGS. 13 and 14, another example of a positioning mechanism 34' is shown. In this configuration, the positioning mechanism 34' includes a mounting plate 300', a shaft 302', a seal 304', and a fastener 306'.

The mounting plate 300' may be similar to or the same as the mounting plate 300 previously discussed but may include a shaft hole 330'. The shaft hole 330' may extend along the actuator axis 200. In at least one configuration, a plurality of shaft engagement features 332' may extend from the shaft hole 330'.

A shaft engagement feature 332' facilitates positioning of the shaft 302'. In the configuration shown, three shaft engagement features 332' are provided; however, it is contemplated that a greater or lesser number of shaft engagement features may be provided. A shaft engagement feature 332' may have any suitable configuration. For example, a shaft engagement feature 332' may be provided with a male configuration, female configuration, or combinations thereof. In the configuration shown, the shaft engagement features 332' are configured as notches that extend away from the actuator axis 200. A shaft engagement feature 332' could be configured as a protrusion that extends toward the actuator axis 200.

Each shaft engagement feature 332' corresponds with a different shift collar position when multiple shaft engagement feature 332' are provided. For example, a first shaft engagement feature 332' may correspond with a low gear ratio or the first position, a second shaft engagement feature 332' may correspond with the second position or neutral position, and a third shaft engagement feature 332' may correspond with the high gear ratio or third position.

One or more indicator markings 334' may optionally be provided to provide a visual indication of the position or gear ratio associated with a particular shaft engagement feature, and hence the position of the shift collar 170. In the example shown, the first position or low gear ratio is designated with the L, the second or neutral position is designated with the letter N, and third position or high gear ratio is designated with the letter H.

The shaft 302' is receivable in the shaft hole 330' of the mounting plate 300'. The shaft 302' may extend along the actuator axis 200 when the positioning mechanism 34' is installed in place of the actuator 178. In at least one configuration, the shaft 302' may include spline teeth 322 as previously discussed. In addition, the shaft 302' may include a shaft flange 340', a shaft body 342', a shaft positioning feature 344', a shaft stud 346', or combinations thereof.

The shaft flange 340' may extend away from the actuator axis 200. The shaft flange 340' may engage a side of the mounting plate 300' that faces toward the axle assembly 10 when the shaft 302' is assembled to the mounting plate 300'.

The shaft body 342' may extend from the shaft flange 340'. The shaft body 342' may be receivable in the shaft hole 330'. The shaft body 342' may have a smaller diameter than the shaft flange 340'. The shaft body 342' may extend axially from the shaft flange 340' to the shaft stud 346', if provided.

The shaft positioning feature 344' may be provided with the shaft body 342'. The shaft positioning feature 344' may cooperate with the shaft engagement feature 332' to position the shaft 302' in a desired rotational position along the actuator axis 200 with respect to the mounting plate 300'. In addition, the shaft positioning feature 344' may inhibit rotation of the shaft 302' about the actuator axis 200 with respect to the mounting plate 300'. A shaft positioning feature 344' may be provided with any configuration that is compatible with a shaft engagement feature 332'. For instance, a shaft positioning feature may be provided with a male configuration, female configuration, or combinations thereof. In the configuration shown, the shaft positioning feature 344' is configured as a protrusion that extends away from the actuator axis 200. In such a configuration, the shaft positioning feature 344' may be received in one of the shaft engagement features 332' to inhibit rotation of the shaft 302' about the actuator axis 200.

The shaft stud 346' facilitates mounting of the fastener 306'. The shaft stud 346' may extend from the shaft body 342'. In addition, the shaft stud 346' may extend along the actuator axis 200. The shaft stud 346' or a portion thereof may be disposed outside of the shaft hole 330' and may extend in a direction that extends away from the shaft flange 340'. The shaft stud 346' may be threaded and may facilitate mounting of a fastener 306' that is configured as a nut. Alternatively, the shaft stud 346' could be omitted in a configuration in which the fastener 306' is configured as a bolt. For instance, a threaded hole could be provided in the shaft body 342' into which a fastener that is configured as a bolt could be screwed into to secure the shaft 302' to the mounting plate 300'.

The positioning mechanism 34' shown in FIGS. 13 and 14, may be installed in a similar manner as the positioning mechanism 34 previously discussed. However, in this configuration the shaft 302' may be positioned with respect to the mounting plate 300' before installing the positioning mechanism 34' in place of the actuator 178. For instance, the shaft 302 may be removed from the mounting plate 300', aligned with the shaft hole 330', and rotated about the axis to align the shaft positioning feature 344' with a desired shaft engagement feature 332'. As an example, the shaft positioning feature 344' may be aligned with the shaft engagement feature 332' that is associated with the neutral position when it is desired to position and secure the shift collar 170 in the neutral position. Then, the shaft 302' may be moved along the axis into the shaft hole 330' such that the shaft engagement feature 332' mates with the shaft positioning feature 344', thereby inhibiting rotation of the shaft 302' with respect to the mounting plate 300'. Then, the shaft 302' may be secured to the mounting plate 300' with the fastener 306' to inhibit the shaft 302' from moving along the axis with respect to the mounting plate 300', thereby resulting in the assembled configuration shown in FIG. 13.

The same method steps shown in FIGS. 8-12 may then be employed to remove the actuator 178, install the positioning mechanism 34' in place of the actuator 178, move the positioning mechanism 34', if necessary, to move the shift collar 170 to a desired position along the axis 70, and secure the positioning mechanism 34' to the axle assembly 10. The resulting position of the shift collar 170 will be a function of the rotational position of the shaft 302' with respect to the mounting plate 300'.

Referring to FIGS. 15 and 16, another example of a positioning mechanism 34" is shown. In this configuration, the positioning mechanism 34" includes a mounting plate 300" and a shaft 302". The shaft 302" is rotatable with respect to the mounting plate 300" when the positioning mechanism 34" is secured to a housing of the axle assembly 10 in this configuration.

The mounting plate 300" includes one or more through holes 310 that facilitate mounting of the mounting plate 300" to a housing 140 of the axle assembly 10 as previously described. The mounting plate 300" also includes a shaft hole 330' that may be a through hole as previously described. The shaft 302" is received in the shaft hole 330' and may be rotatable about the actuator axis 200 with respect to the mounting plate 300" when the mounting plate 300" is secured to the axle assembly 10. The mounting plate 300" may also include indicator markings 334' that provide a visual indication of the position of the shift collar 170. In the configuration shown, the L, N, and H indicator markings 334' are provided as previously discussed. Alternatively or optionally, a contour change such as a notch or protrusion may be associated with each indicator marking to provide a tactile or visual reference.

The shaft 302" may be received in the shaft hole 330' and may include spline teeth 322 as previously discussed. In addition, the shaft 302" may include an engagement feature 350" and a pointer 352".

The engagement feature 350" may be configured to facilitate rotation of the shaft 302". The engagement feature 350"

may have any suitable configuration. For instance, the engagement feature 350" is disposed along the actuator axis 200 and may have a male configuration, female configuration, or combinations thereof. The engagement feature 350" may be engaged or grasped by hand or with a tool. In the configuration shown in FIGS. 15 and 16, the engagement feature 350" is configured with a hex head that may be engaged by a tool 324, such as a socket or a wrench.

The pointer 352" may be configured to point to an indicator marking 334' to provide a visual or tactile indication as to position of the shift collar 170 that is associated with the rotational position of the shaft 302".

Referring to FIG. 16, a shaft retainer 354" may be provided to inhibit movement of the shaft 302" along the actuator axis 200 and removal of the shaft 302" from the shaft hole 330' of the mounting plate 300". The shaft retainer 354" may have any suitable configuration. For instance, the shaft retainer 354" may be a clip, snap ring, pin, threaded fastener, or the like.

The method steps associated with this positioning mechanism 34" may differ somewhat from the method steps associate with the previous positioning mechanism 34' in that the positioning mechanism 34" may be secured to the housing 140 of the axle assembly 10 before the positioning mechanism 34" is moved to move the shift collar 170. For instance, the actuator 178 may be removed from the housing 140 as previously discussed with respect to FIG. 9 and then positioning mechanism 34" may be installed in place of the actuator 178 as previously discussed with respect to FIG. 10. Next, the positioning mechanism 34" may be secured to the axle assembly 10 in a similar manner as in FIG. 12. For instance, the positioning mechanism 34" may be secured to the housing 140 of the axle assembly 10 by reinstalling at least one fastener 220, such as by inserting a fastener 220 through a through hole 310 in the mounting plate 300" as previously described. Securing the positioning mechanism 34" prevents the mounting plate 300" from rotating about the actuator axis 200. However, the shaft 302" is able to rotate about the actuator axis 200 with respect to the mounting plate 300".

Next, the positioning mechanism 34" may be moved after securing the positioning mechanism 34" to the housing of the axle assembly 10 to move the shift collar 170 along the axis 70 to a desired position. Thus in this context, moving the positioning mechanism 34" is associated with moving the shaft 302" of the positioning mechanism 34" rather than moving the mounting plate 300" or the entire positioning mechanism 34". For example, moving the positioning mechanism 34" may include rotating the shaft 302" about the actuator axis 200 with respect to the mounting plate 300". Force may be exerted on a portion of the shaft 302", such as the engagement feature 350", to rotate the shaft 302 to a desired position. In FIG. 15, the shaft 302 is shown in the neutral position.

Figure 17:
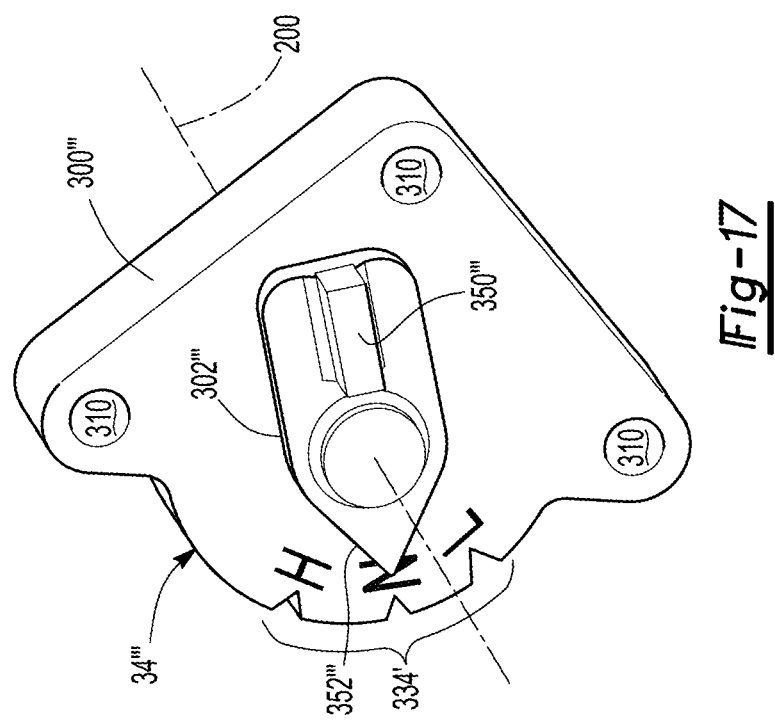
FIG. 17 is a perspective view of another example of a positioning mechanism.

Referring to FIG. 17, another configuration of a positioning mechanism 34''' is shown. This configuration is effectively the same as that shown in FIGS. 15 and 16 except that location of the engagement feature 350''' has changed. In this configuration, the engagement feature 350''' is illustrated as not being disposed along and not intersecting the actuator axis 200. The engagement feature 350''' may have any of the configurations previously discussed with respect to engagement feature 350". In the configuration shown, the engagement feature 350''' is depicted as having a male configuration that is a protrusion having a generally rectangular profile rather than a hex head.

It is contemplated that a positioning mechanism having a rotatable shaft may be configured to resist rotation about the actuator axis 200 by itself. This may be beneficial when a detent mechanism 176 is not provided or is inoperative. Rotation of the shaft 302", 302''' about the actuator axis 200 with respect to the mounting plate 300", 300''' can be resisted in various ways, such as by friction between the shaft outside diameter and the mounting plate, friction between the shaft outside diameter and an intervening sleeve or other component that is disposed in the shaft hole in the mounting plate, friction due to axial compression against the mounting plate that resists rotation, by providing a different detent feature that allows the shaft or pointer to lock onto the mounting plate, by a fastener that is installed after the shaft is rotated to a desired position, or any combination of the above.

The present invention may allow the shift collar to be actuated independent of the actuator. This may allow the shift collar to be manually actuated when the actuator is inoperative, such as in a situation in which electrical power is not available to the actuator, when the actuator is stuck or partially stuck and is impaired from moving along the axis, or when a system fault exists that intentionally prevents the actuator from operating.

The present invention permits a shift collar to be actuated from outside the axle assembly to a neutral position or a particular gear ratio without extensive disassembly and reassembly of the axle assembly, which helps reduce time and associated costs.

The present invention may also allow the shift collar to be secured in a neutral position to decouple the differential assembly from the transmission and the electric motor. The shift collar may be moved and secured in the neutral position to facilitate towing or unpowered movement of the vehicle, such as towing of the vehicle. Moving the shift collar to the neutral position with a positioning mechanism as previously described is faster and less intrusive than alternatives like removing the axle shafts or decoupling the axle shafts from the wheel end assemblies and/or the differential assembly. Moreover, decoupling the axle shafts from the wheel end assemblies and/or the differential assembly is more difficult and complex when wheel end gear reduction is provided, such as with a set of reduction gears that operatively connect the axle shaft to a wheel hub. In such configurations, the wheel end gear reduction makes access to the axle shaft and disassembly more difficult and time-consuming, which may increase costs, require extensive reassembly, and may delay towing until disassembly can be completed as compared to the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling an axle assembly, the method comprising:
   removing an actuator from a housing of the axle assembly, the actuator being adapted to actuate a shift collar;
   installing a positioning mechanism in place of the actuator; and
   securing the positioning mechanism to the housing of the axle assembly.

2. The method of claim 1 wherein removing the actuator includes removing a fastener that secures the actuator to the housing of the axle assembly.

3. The method of claim 1 wherein removing the actuator includes moving the actuator along an actuator axis away from the axle assembly to disconnect an output shaft of the actuator from a cam of the axle assembly, the cam being rotatable about the actuator axis.

4. The method of claim 3 wherein the axle assembly has a detent mechanism and wherein removing the actuator includes engaging the detent mechanism with the cam to inhibit rotation of the cam about the actuator axis.

5. The method of claim 4 wherein the positioning mechanism includes a mounting plate and a shaft that extends from the mounting plate, the cam includes a mounting feature that is couplable to either the actuator or the shaft, and wherein installing the positioning mechanism includes engaging the shaft of the positioning mechanism with the mounting feature.

6. The method of claim 5 wherein installing the positioning mechanism includes moving the shaft along the actuator axis and into engagement with the mounting feature of the cam.

7. The method of claim 5 wherein the shaft is engageable with the mounting feature at a single rotational position about the actuator axis.

8. The method of claim 1 further comprising moving the positioning mechanism after installing the positioning mechanism in place of the actuator, wherein moving the positioning mechanism moves the shift collar.

9. The method of claim 8 wherein moving the positioning mechanism includes attaching a tool to the positioning mechanism and exerting force with the tool that rotates the positioning mechanism.

10. The method of claim 8 wherein moving the positioning mechanism occurs before securing the positioning mechanism to the housing of the axle assembly.

11. The method of claim 10 wherein the shift collar is moveable along an axis and rotatable about the axis and securing the positioning mechanism inhibits movement of the shift collar along the axis.

12. The method of claim 10 wherein moving the positioning mechanism includes rotating the positioning mechanism about an actuator axis.

13. The method of claim 12 wherein the positioning mechanism includes a mounting plate and a shaft that extends from the mounting plate and rotating the positioning mechanism includes rotating the mounting plate and the shaft together about the actuator axis.

14. The method of claim 8 wherein moving the positioning mechanism occurs after securing the positioning mechanism to the housing of the axle assembly.

15. The method of claim 14 wherein the positioning mechanism includes a mounting plate and a shaft that extends from the mounting plate and moving the positioning mechanism includes rotating the shaft about an actuator axis with respect to the mounting plate.

16. The method of claim 15 wherein the shift collar is moveable along an axis and wherein the mounting plate includes an indicator mark that indicates a position of the shift collar along the axis.

17. The method of claim 1 wherein the positioning mechanism includes a mounting plate and a shaft that is positionable with respect to the mounting plate, and wherein installing the positioning mechanism in place of the actuator includes positioning the shaft with respect to the mounting plate before installing the positioning mechanism in place of the actuator.

18. The method of claim 17 wherein positioning the shaft with respect to the mounting plate includes inserting the shaft into a hole in the mounting plate at a designated rotational position.

19. The method of claim 1 wherein removing the actuator includes removing a fastener that secures the actuator to the housing of the axle assembly and securing the positioning mechanism includes reinstalling the fastener to secure the positioning mechanism to the housing of the axle assembly.

20. The method of claim 1 wherein securing the positioning mechanism holds the shift collar in a neutral position that decouples a transmission of the axle assembly from a differential assembly of the axle assembly.

* * * * *